United States Patent
McCormack et al.

(10) Patent No.: US 8,363,817 B2
(45) Date of Patent: Jan. 29, 2013

(54) METHODS AND SYSTEMS FOR MONITORING CONTACT SESSIONS OF A CONTACT CENTER

(75) Inventors: Tony McCormack, Galway (IE); Neil O'Connor, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 177 days.

(21) Appl. No.: 12/907,678

(22) Filed: Oct. 19, 2010

(65) Prior Publication Data

US 2012/0093306 A1  Apr. 19, 2012

(51) Int. Cl.
*H04M 3/00* (2006.01)
(52) U.S. Cl. .................. 379/265.12; 379/265.06
(58) Field of Classification Search ............. 379/265.03, 379/265.06, 265.12, 265.13
See application file for complete search history.

(56) References Cited

U.S. PATENT DOCUMENTS

| | | | |
|---|---|---|---|
| 2006/0173724 A1* | 8/2006 | Trefler et al. | 705/8 |
| 2009/0003583 A1* | 1/2009 | Carretto et al. | 379/265.06 |
| 2009/0316687 A1* | 12/2009 | Kruppa | 370/352 |
| 2010/0036670 A1* | 2/2010 | Hill et al. | 705/1 |
| 2010/0198647 A1* | 8/2010 | Bowers et al. | 705/9 |
| 2012/0045042 A1* | 2/2012 | Minert et al. | 379/88.04 |
| 2012/0077472 A1* | 3/2012 | Timmins et al. | 455/414.1 |

* cited by examiner

*Primary Examiner* — Creighton Smith
(74) *Attorney, Agent, or Firm* — Maldjian Law Group LLC; John P. Maldjian, Esq.; Alexander D. Walter, Esq.

(57) ABSTRACT

A system for monitoring contact sessions of a contact center. The system comprises a work assignment engine for allocating contacts received at the contact center to resources of the contact center and a monitoring module, arranged to detect an allocation of a contact to a resource to determine a skill requirement of the contact. The work assignment engine is further arranged to fork a session between an originator of the contact and the resource, to a monitor resource, in response to the detected skill requirement satisfying a monitor resource skill requirement.

28 Claims, 2 Drawing Sheets

METHODS AND SYSTEMS FOR MONITORING CONTACT SESSIONS OF A CONTACT CENTER

BACKGROUND OF THE INVENTION

1. Field Of The Invention

The present invention relates to methods and systems for monitoring contact sessions of a contact center.

2. Description of Related Art

Contact centers, including traditionally voice-only call centers as well as multimedia contact centers adapted to handle contacts in other media, employ numerous agents, having various skillsets, to service customer load. Meeting the needs of the customers in a timely and efficient manner is paramount to a successful and profitable contact center and accordingly, it is often desirable for a third party to monitor a contact session between a customer and an agent, for supervising or training purposes for example.

In general, new agents are trained in a particular skill by subjecting them to canned examples of contact sessions using flash video and audio recordings. Although canned material provides useful general instruction for the trainee, it is not, by its very nature, specific to current real-time contact center activity, such as dealing with current events or new commercial offerings.

Contact center agents have attested that being exposed to experienced agents partaking in contact sessions is a very effective learning method. Thus, the trainees are often assigned to an experienced agent to gain first hand knowledge of how the agent deals with various contacts. Physical proximity to a trained agent thereby enables the trainee to monitor the agent's desktop interaction as well as the contact sessions assigned to them.

The normal talk-time in a non-predictive contact center is approximately thirty-five minutes per hour. Therefore, a trainee assigned to an agent is benefiting from the agent's interaction with contacts for around 50% of the allotted training time. It will also be appreciated that the physical presence of a trainee may have an adverse effect on an agent, distracting them from dealing with their assigned contacts in an effective and timely fashion. Furthermore, agents are skilled in various skills relevant to the contact center, for example, technical support, sales, languages etc, and it may be the case that some of the contacts assigned to the agent are not relevant to the trainee's training program.

Supervisors of contact centers are, in general, provided at their terminal, with an interface displaying a grid of the agents of the contact center under their supervision. If a supervisor wishes to monitor a session between a given agent and a customer, the agent is selected and a request is sent from the supervisor's terminal to a contact center server. In response to the request, the contact center server is arranged to fork the session to the supervisor's terminal, to thereby enable a supervisor to monitor the session between the agent and customer.

Therefore, there is a need to provide improved methods and systems for monitoring contact sessions of a contact center.

SUMMARY

According to an embodiment of the present invention there is provided a system for monitoring contact sessions of a contact center, the system comprising: a work assignment engine for allocating contacts received at the contact center to resources of the contact center; and
a monitoring module, arranged to detect an allocation of a contact to a resource and determine a skill requirement of the contact;
wherein the work assignment engine is further arranged to fork a session between an originator of the contact and the resource to a monitor resource, in response to the detected skill requirement satisfying a monitor resource skill requirement.

Advantageously, by notifying or pre-warning the work assignment engine of the assignment of a contact to a resource involving a specific skill requirement, the work assignment engine is prepared to fork the session to the monitor as soon as it is initialized, thereby ensuring that the monitor is capable of monitoring the complete session if desired.

Preferably, the work assignment engine maintains at least one contact skillset queue and is arranged to assign contacts received at the contact center to one or more of the at least one contact skillset queue in accordance with information gleaned from the contact during an IVR session and/or data retrieved from the customer's profile.

Preferably, the skill requirement of the contact corresponds with the skills associated with the contact skillset queue to which the contact was assigned.

Alternatively or in addition, the monitoring module determines a skill requirement of the contact by accessing information gleaned from the contact during an IVR session and/or data retrieved from the customer's profile.

Preferably, the work assignment engine maintains a resource queue and is arranged to assign agents of the contact center to the resource queue based on agent configuration information.

Preferably, said agent configuration information comprises agent skills including one or more of: languages, competence in different topics associated with the contact centre, contact type single or multitasking contact capabilities, and agent location.

Alternatively, the skill requirement of the contact corresponds with the skills associated with the resource queue from which an agent was allocated to the contact.

Preferably, the work assignment engine and/or the monitoring module is capable of accessing a monitor configuration database to retrieve monitor resource skill requirements.

Preferably, the monitor configuration database comprises a schedule defined for each monitor, wherein the schedule comprises times for allocation of session and or training programs to the respective monitor resources, to thereby simulate a workload of an experienced agent of the contact centre.

Preferably, the work assignment engine is arranged to assign monitor resources to one or more monitor resource skillsets.

Preferably, the work assignment engine maintains a monitor resource buffer to which monitor resources are assigned based on monitor configuration information.

Alternatively, the work assignment engine is arranged to assign monitor resources to the resource queues, based on monitor configuration information.

Preferably, subject to the detected skill requirement satisfying a monitor resource skill requirement, the work assignment engine is arranged to propagate through the resource queue, to determine whether the queue includes at least one monitor resource.

Preferably, responsive to the detected skill requirement satisfying a monitor resource skill requirement associated with multiple monitor resources, the work assignment engine is arranged to fork the session between the originator of the contact and the resource to the multiple monitor resources.

Preferably, responsive to the session being forked to the monitor resource, the monitor resource is capable of usurping control of the session.

Preferably, responsive to the session being forked to the monitor resource, the monitor resource involvement in the session is curbed in accordance with a set of permissions associated with the monitor resource.

Preferably, the work assignment engine is further arranged to maintain a schedule for each monitor, wherein the schedule comprises a plurality of entries indicating times and associated session types, and the work assignment engine is further arranged to fork the session types to the monitor resource in accordance with the associated times.

Preferably, the resources are agent resources of the contact center.

Preferably, the monitor resources are trainee agent resources of the contact center.

Alternatively, the monitor resources are supervisor resources of the contact center.

There is further provided a computer-implemented method of monitoring contact sessions at a contact center, the method comprising the steps of:
  allocating contacts received at the contact center to resources of the contact center; and
  detecting an allocation of a contact to a resource and determine a skill requirement of the contact;
  forking a session between the contact and the resource to a monitor resource in response to the detected skill requirement satisfying a monitor resource skill requirement.

According to another embodiment of the present invention there is provided a system for monitoring contact sessions of a contact center, the system comprising:
  a work assignment engine for assigning contacts received at the contact center to resources of the contact center; and
  a monitoring module, arranged to detect an assignment of a contact to a resource and determine a skill requirement of the contact;
  wherein the work assignment engine is further arranged to fork a session between an originator of the contact and the resource, to a monitor resource, in response to the detected skill requirement satisfying a monitor resource skill requirement.

According to another embodiment of the present invention there is provided a system for monitoring contact sessions of a contact center, the system comprising: a work assignment engine for assigning contacts received at the contact center to resources of the contact center; and
  a monitoring module, arranged to detect an initialization of a session between a contact and a resource and to determine a skill requirement of the session;
  wherein the work assignment engine is further arranged to fork the session to a monitor resource, in response to the detected skill requirement satisfying a monitor resource skill requirement.

Preferably, the determination of a skill requirement of a session involves accessing information gleaned from the contact during an IVR session and/or data retrieved from the customer's profile.

Alternatively or in addition, the determination of a skill requirement of a session involves monitoring the session to identify the skill requirements employed. For example, this may involve employing voice detector and analyzers, and text parsers and analyzers.

Preferably, the monitoring module is further arranged to monitor the session and update the skill requirement associated with the session, based on information derived from the monitored session.

Further benefits and advantages of the invention will become apparent from a consideration of the following detailed description given with reference to the accompanying drawings, which specify and show preferred embodiments of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION

Embodiments of the present invention are described below by way of example only. These examples represent the best ways of putting the invention into practice that are currently known to the Applicant although they are not the only ways in which this could be achieved.

Figure 1:
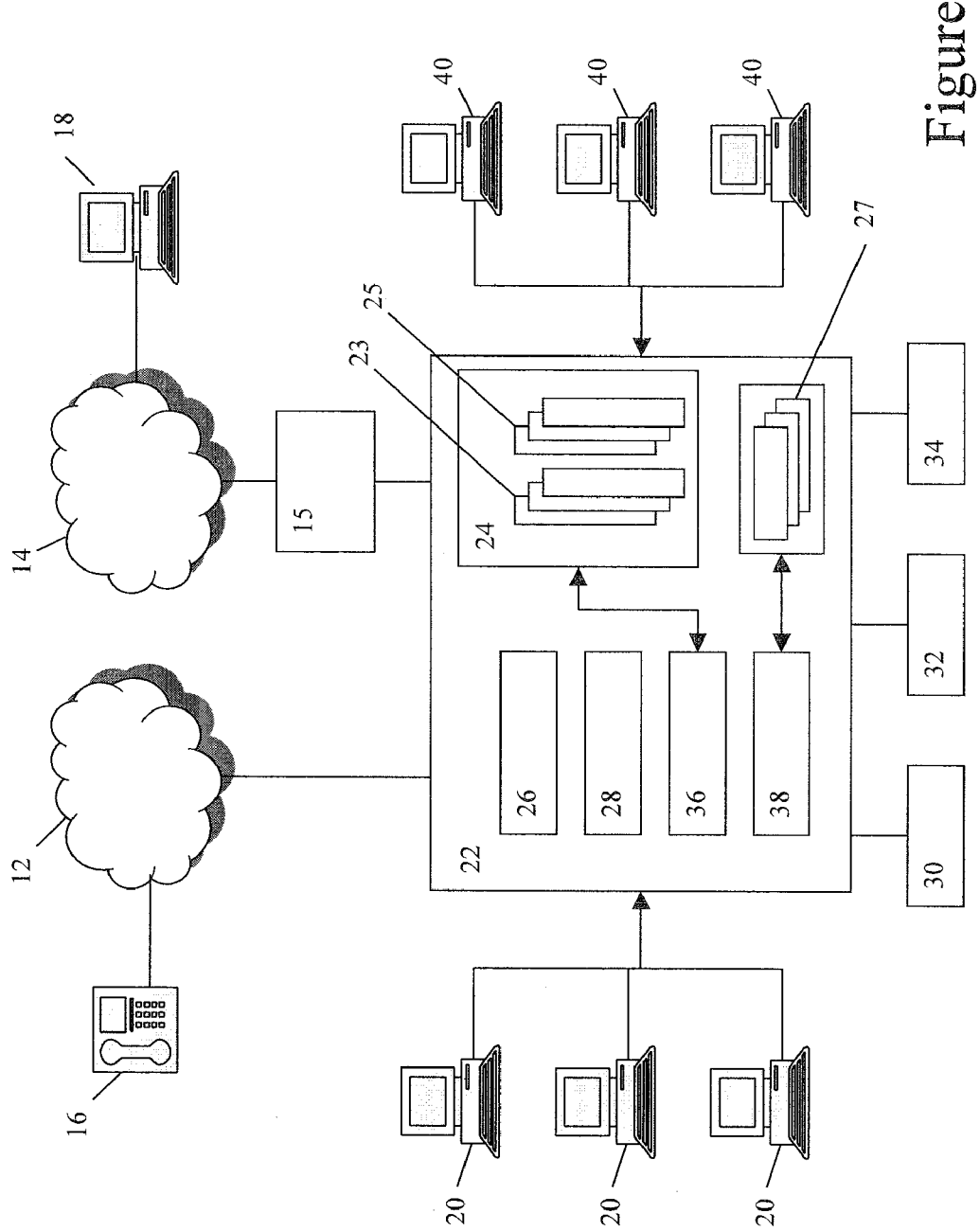
FIG. 1 is a block diagram showing the architecture of a contact center and its environment, according to the preferred embodiment of the present invention, is provided.

In FIG. 1 there is indicated, generally at 10, a contact center connected to the public switched telephone network (PSTN) 12 and to the Internet 14. An Internet telephony gateway 15 is provided to translate between a private branch exchange (not shown) in the contact center and the Internet 14. Alternatively, the contact center may be enabled for voice over IP (VoIP) communications, such that direct telephony communications with the Internet may be made, and in such cases, translation between the VoIP environment of the contact center and the PSTN 12 will be mediated by appropriate equipment in known manner. Using the PSTN 12 and Internet 14, respectively, customers 16, 18 may connect to the contact center using conventional telephony equipment, as in the case of customer 16, or using Internet-enabled hardware or software, as in the case of customer 18 (e.g. dedicated voice or video Internet telephony equipment, or a computer with appropriate software for such telephony, or a computer with instant messaging software).

The contact center itself is, to a large extent, conventional, and the operation of such a contact center will be well known to the skilled person. Thus, for example, a plurality of agent workstations 20 are provided allowing human agents to service both incoming and outgoing contacts. While this embodiment is described only in relation to voice calls, the contact center will typically be a multimedia contact center serving contacts of different media types in addition to or instead of simple voice calls. For example, contact centers may service video calls, instant messaging (IM) sessions and emails, to provide but a few examples. Each agent workstation 20 is provided with suitable client software to enable contacts in the relevant media types to be presented to the agent. The client software will be integrated with, for example, telephony equipment or video equipment so that the agent is enabled to speak with the customers 16, 18 by voice or video link.

Communications sessions are handled by a contact center server 22, which operates a plurality of queues 24, manages the agent resources 26, and is programmed with workflows

28. In this way, an incoming call or contact from a customer 16, 18, is processed in accordance with the instructions contained in a workflow 28. Typically, this may involve placing the call in a conference with an interactive voice response (IVR) server 30, which plays recorded announcements to the customer and requests inputs from the customer. These inputs are stored and used by the contact center to traverse an IVR workflow until all relevant information has been gleaned from the client, and subsequently, to place the contact in one of the queues 24. Usually, this is done by assigning the contact to one or more skillsets, each skillset being serviced by an agent or group of agents with the requisite skills to handle queries relating to that skillset.

The contact center server 22 further comprises a work assignment engine, WAE, 36 arranged to allocate and route contacts to suitable agents. If an agent is free, the contact can be assigned directly to an agent (by manipulation of appropriate software objects in the queues 24 and agent resources 26), with the result that the customer is placed in conference with one of the agents, who can then deal directly with the questions or concerns of the customer. More typically, agent resources are limited and the contact is assigned to a contact skillset queue 23 along with other contacts, which are waiting for the same agent resources. The contacts are serviced according to various criteria including waiting time, priority, urgency, media type and so forth. When a contact reaches the top of a queue, it is assigned to the next available agent. During the time that a contact is in a queue, the caller will typically be placed on hold and provided with entertainment, music, announcements, advertisement or other content, represented in FIG. 1 by music-on-hold server 32. It is not unusual in such circumstances to occasionally provide the customer with an indication of the position in queue or the wait time expected until an agent is free, or to allow the customer to request such information by making appropriate key presses or speaking appropriate key words.

As discussed above, on receipt of a contact from a customer at the contact center, the contact center server 22 assigns the contact to one or more contact skillset queues. Preferably, assignment of the contact to a given contact skillset queue 23 is dependent on information gleaned from the contact during an IVR session and/or data retrieved from the customer's profile.

Figure 2:
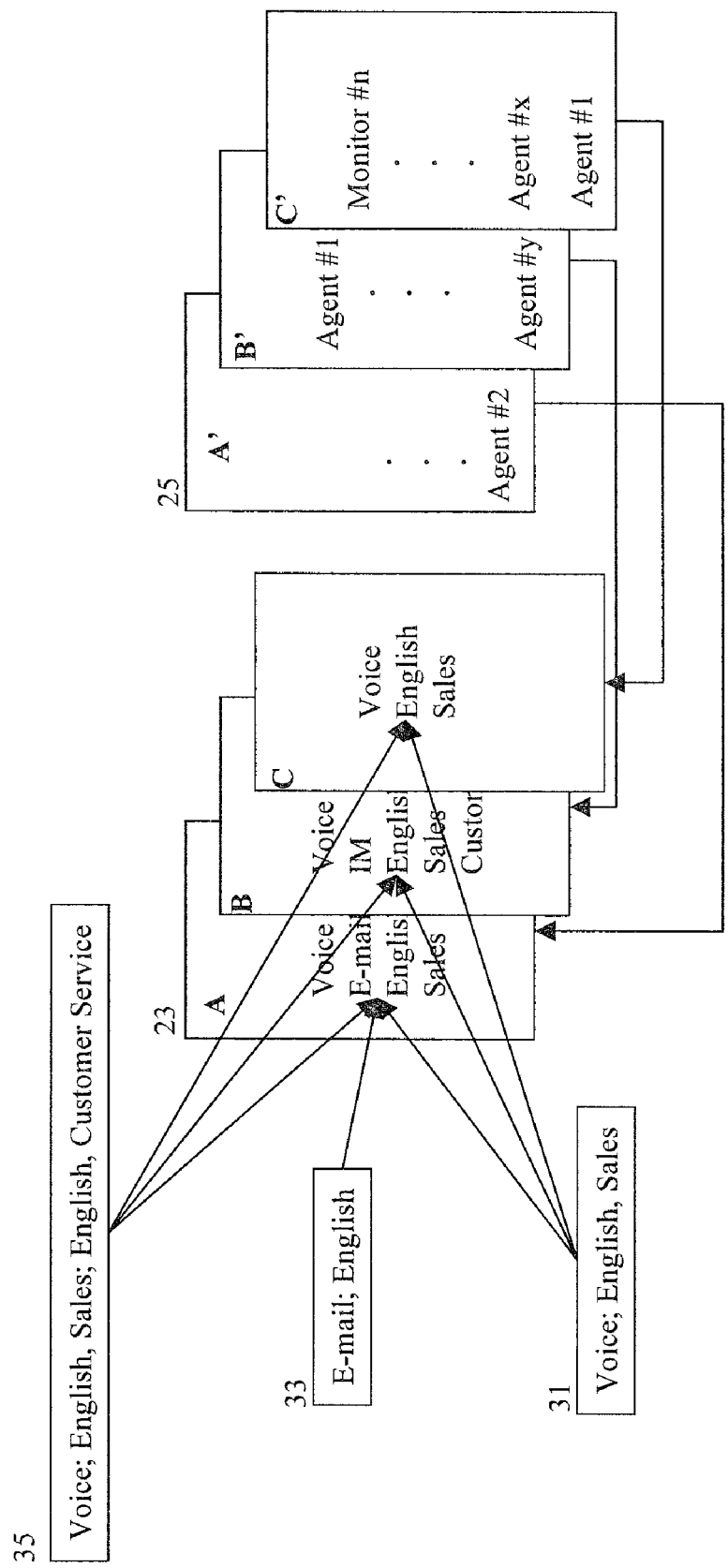
FIG. 2 is a block diagram illustrating the contents of the queues of FIG. 1 in more detail.

For example, and referring to FIG. 2, consider a simple case whereby the contact center server 22 manages three skillset queues, A, B, and C, wherein contact skillset queue A is a queue for contacts requiring assistance from an agent, capable of receiving voice and email contacts, who has proficiency in English, and is trained in sales; contact skillset queue B is a queue for contacts requiring assistance from an agent, capable of receiving voice and instant message, IM, contacts, who has proficiency in English, and is trained in sales and customer service; and contact skillset queue C is a queue for contacts requiring assistance from an agent, capable of receiving voice contacts, who has proficiency in English, and is trained in sales. A contact 31 received at the contact center, as a voice call and requiring the services of an English speaking sales agent, might be assigned to all of contact skillset queues A, B and C, whereas a contact 33 received at contact center, as an email and requiring the services of an English speaking sales agent, will be assigned to contact skillset queue A only. In the case that a contact is assigned to more than one contact skillset queue for a single request, in most circumstances, once the contact is assigned to an agent, the instance of the contact in all related contact skillset queues is removed.

However, it will be appreciated that in certain circumstances, an instance of a contact may remain in a contact skillset queue despite the fact that the contact is or has been assigned to an agent. Consider for example the case a voice call contact 35 is received at the contact center, requiring the services of an English speaking sales agent and an English speaking customer service agent. In one embodiment, the WAE 36 might assign the contact to contact skillset queues A, B and C. In the case that the contact in contact skillset queue B propagates to the top of the queue and is first assigned to an agent, the instances of the contact in contact skillset queue A and C will be removed as all requests of the contact can be dealt with by the agent associated with skillset B. However, were the contact to propagate to the top of contact skillset queue A or C, prior to propagating to the top of contact skillset queue B, the instance of the contact in either of contact skillset queue A or C, would be deleted appropriately. However, the instance of the contact in skillset queue B would remain as the agent allocated to the contact in contact skillset queue A or C is not capable of dealing with customer services requests, which need to be dealt with by agents associated with contact skillset queue B.

Clearly, resources or agents of the contact center are associated with particular skills and are therefore registered as being capable of dealing with contacts of at least one contact skillset queue 23. Typically, agent resources identified as available are maintained in at least one of a set of resource queues 25, wherein each resource queue 25 is associated with a set of agent skills with each resource queue 25 providing agents with the necessary resources. In some cases, when the agents are assigned a contact by the WAE 36, they are flagged as busy and removed from the resource queue(s). However, in the preferred embodiments, agent resources may comprise multitasking agents, capable of processing more than one contact at any time. For example, any agent might be allocated a voice call contact, two email contacts and an IM contact for concurrent processing.

It will be appreciated that the number of contact skillset queues 23 and the number of resource queues 25 may be the same or may differ. Thus, it may be the case that as in FIG. 2, the contact skillset queues 23 correspond with resource queues 25 such that agents from a given queue are assigned only to contacts of the corresponding contact skillset queue 23. Taking the example above of the contact center maintaining three contact skillset queues, A, B, and C. In such an example, there would also be provided three corresponding resource queues, A', B' and C', wherein contacts from contact skillset queues A, B, and C, would be assigned agents exclusively from resource queues A', B' and C', respectively. However, it will be appreciated that in such an embodiment, as is the case where there are multiple instances of a single contact within a plurality of contact skillset queues 23, an agent resource, for example, Agent #1, may be present in more than one resource queue 25 at the same time.

Alternatively, the number of resource queues 25 may exceed the number of contact skillset queues 23, such that a contact in a first skillset queue may be assigned an agent from any one of a number of resource queues 25. For example, consider a contact queuing in contact skillset queue B, i.e., a voice call, requiring an English speaking sales agent. If for example, the set of resource queues 25 comprises resource queue D', including English speaking agents, capable of receiving voice calls and trained in sales, resource queue E', including English and Spanish speaking agents, capable of receiving voice calls and trained in sales, and resource queue F', including English speaking agents, capable of receiving voice calls and emails and trained in sales, a contact queuing in contact skillset queue B might be satisfactorily processed by an agent assigned from any of resource queues D', E' or F'.

It will be appreciated that at busy times for the contact center, the number of contacts arriving at the contact center might exceed the number of resources available to handle the contacts. In such a case, the contact skillset queues 23 could potentially approach capacity or full, whereas, the resource queues 25 could potentially empty or almost empty. In contrast, during quiet periods at the contact center, the number of resources available at the contact center might exceed the number of contacts arriving at the contact center. In such a case, the contact skillset queues 23 could potentially be empty or almost empty, whereas, the resource queues 25 could potentially approach capacity or full. It will be appreciated that the balance of contacts in the contact skillset queue, and the resources in the resource queue will vary depending on a type of business being employed at the contact centre.

In order to enable the monitoring of contact sessions between customers and agent, for example for supervising or training purposes, the WAE 36 further comprises a work assignment engine monitoring module 38, as illustrated in FIG. 1.

The monitoring module 38 is arranged to monitor assignments of contacts to agents, as well as existing sessions, to thereby identify a suitable session to fork or route to a particular monitor, for example, an agent supervisor or trainee agent. Preferably, as with agent workstations 20, each monitor is equipped or has access to a workstation 40 provided with suitable client software to enable the monitor to observer and/or service both incoming and outgoing contact sessions forked or routed to their workstations. The client software will be integrated with, for example, telephony equipment or video equipment.

Preferably, subjects or types of sessions of interest to a monitor are stored in a monitor configuration database, (not shown) accessible for example, by the contact center server 22, and in particular, the monitoring module 38. However, it will be appreciated that the subjects or types of sessions of particular interest to a given monitor may be provided to the monitoring module 38 in any suitable manner to enable the monitoring module to monitor for suitable sessions. For example, a monitor may be a trainee agent being trained in the art of cross selling. Thus, that monitor might have an indication in the monitor configuration database, that sessions involving contacts identified as cross selling opportunities, be forked to that monitor. For example, consider the case where a contact relates to health insurance sales. Heath insurance sales might be identified as a potential cross selling opportunity with car, house and holiday insurance sales, for example, and the monitor will then be forked to the session to thereby monitor how the agent deals with the cross selling opportunity.

Once a session is forked or routed to a monitor's workstation 40, the monitor is provided with all voice and desktop interaction, to thereby provide the monitor with a real view of the processing of contacts by an agent 20 of the contact center 10. In particular, pop-ups accompanying contacts are visible to the monitor to thereby enable the monitor to determine how the agent is sourcing necessary information to enable them to process the contact.

In a first embodiment, the WAE 36 or the monitoring module 38 assigns monitor resources to one or more monitor skillsets to thereby identify agent or contact skills of interest to the monitors. The monitoring module 38 is arranged to detect an initialization of a session or alternatively, the existence of a session, suitable for a given monitor resource, it directs the WAE 36 to fork the session to the monitor.

However, in the case that there are no suitable sessions for forking to a given monitor, the monitor resource is assigned to a monitor resource buffer 27 along with other monitor resources, which are waiting for the same session types. As with the contact skillset queues 23, the monitor resources can be serviced according to various criteria including waiting time, priority, urgency, media type and so forth. When a monitor resource is in the buffer 27, if possible, it is forked to the next available session detected by the monitoring module 38.

For example, consider the case where it is desired to fork sessions involving voice calls in English which are of a sales nature, to a plurality of trainee agents waiting in a given monitor resource buffer 27. Using the above example, the monitoring module will detect the assignment of an agent to a contact in any of contact skillset queues A, B or C, and identify the resulting session as one which corresponds to the requirements of the trainee agents. The WAE will then fork the session to each of the trainee agents in the monitor resource buffer 27. It will be appreciated that although the WAE is capable of forking a single session to a plurality of monitors, the number of monitors to which a session may be forked may be curbed due to engineering limitations, for example, by a conference card in the PBX (not shown). Nonetheless, it will be appreciated that the embodiments enable a plurality of monitors of a monitor resource buffer 27 to be processed by forking a single suitable session to the monitors.

In this embodiment, the monitoring module is arranged to detect the skills to be or being required during the sessions. For example, a contact queuing in contact skillset queue A might be either an email or a voice call. If a monitor wishes to monitor English speaking sales calls only, it may not be desirable to fork English language sales email sessions to the monitor. A further example might involve a contact queuing in skillset queue B and requiring the services of an agent trained in either sales or customer services. Thus, if a monitor wishes to monitor English speaking sales calls only, again it might not be desirable fork English language customer service sessions to the monitor. Thus, the monitoring module is arranged to determine the actual skills to be employed during the session.

In the preferred embodiment, this is achieved by accessing information gleaned from the contact when determining in which contact skillset queue 23 to place that contact. However, it will be further appreciated that the skills being employed in a session may be monitored to determine suitable sessions. This may be achieved by requesting feedback from the agent and/or client during the session, or more preferably, by employing voice detector and analyzers, and text parsers and analyzers, for example. In particular, an analytics system might be employed to detect sentiment during sessions. Thus, irate sessions might be detected for example, and forked to any monitors known to have an interest in monitoring such sessions.

Alternatively, the monitor resource buffers 27 correspond with the resource queues 25 such that on detection by monitoring module 38 of the assignment of a contact to an agent, the monitoring module 38 directs the WAE to fork the resulting session between the customer contact and agent to any monitors queuing in the monitor resource buffer 27 that correspond to the resource queue 25 from which the agent was selected for assignment to the contact.

Alternatively, the monitor resource buffers 27 correspond with the contact skillset queues 23 such that on detection by monitoring module 38 of the assignment of a contact to an agent, the monitoring module 38 directs the WAE to fork the resulting session between the customer contact and agent to any monitors queuing in the monitor resource buffer 27 that correspond to the contact skillset queue 23 from which the contact was selected for assignment to the agent.

In a second embodiment, the WAE 36 or the monitoring module 38 assigns monitor resources to one or more skillsets to thereby identify agent skills of interest to the monitors. As with the first embodiment, if the monitoring module 38 detects an initialization of a session or alternatively, the existence of a session, suitable for a given monitor resource, it directs the WAE 36 to fork the session to the monitor.

However, in the case that there are no suitable sessions for forking to a given monitor, the monitor resource is assigned to the resource queue 25 along with other monitor resources, which are waiting for the same sessions, for example Monitor #n in FIG. 2. When a contact is assigned to an agent of the resource queue 25, or alternatively, a suitable existing session is identified, the session between the contact and agent is forked to at least one monitor resource in that resource queue 25. This can be achieved by implementing a skipping algorithm which is activated by the assignment of an agent, for example, Agent #1 or Agent #x from the queue to a contact and is arranged to propagate through the resource queue 25 to identify any monitor resources provided therein. The WAE then forks the session to those monitors indicated by the identified monitor resources. However, it will be appreciated that any suitable means may be employed to identify monitor resources within the resource queue to which the session should be forked.

It will be appreciated that if no suitable agent is assigned to a contact received by the contact center server, there will be no session for forking to a monitor. In such a case, the contact is queued until a suitable agent becomes available. The monitor may also be queued and subsequently forked to the resulting session between the contact and agent, or alternatively may be forked a suitable session established between a different contact and an agent.

It will further be appreciated that multiple sessions in which an agent is engaged might be forked to a given monitor. For example, consider the case where the monitor is a trainee agent and wishes to experience a full extent of the workload allocated to an agent. In such a case, if the agent was engaged in a email session with a first contact, and voice call with a second contact and an IM contact with a third contact, all three sessions could be forked to the trainee.

In the preferred embodiment, permissions are associated with the sessions. For example, a trainee agent can be prohibited from interacting with the contacts of any session being processed by an agent, i.e., observe mode, for example, their microphone is muted, and a desktop application is view-only. However, a supervisor can be assigned permission to manage and overwrite any interactions the agent might have with the contact, or alternatively, deal with at least one of the contacts allocated to a multitasking agent, should that agent require assistance in processing the contacts. It will be appreciated that the permissions for each monitor will differ depending on contact center requirements.

In one embodiment, a supervisor can "barge in" on a session between a contact and an agent, interrupting the session and usurping control of the session from the agent, for example, by preventing an email being sent.

In some embodiments, existing agents might be selected for further training and accordingly, the work assignment module is arranged to assign those agents specific training calls. To this end, the agent will also be marked or flagged as a monitor for a specific session type and subject to no suitable sessions being available, be placed in the monitor resource buffer 27 or the resource queue 25, depending on the embodiment being employed.

In a further embodiment of the present invention, the monitoring module 38 is arranged to present to a monitor 40, a display or grid of sessions suitable for that monitor. The monitor can then select specific sessions of interest by sending a request to the monitoring module, which will, in response and subject to permissions associated with the monitor, fork or route the selected session(s) to the monitor.

In a further aspect of the present invention, the monitoring module is arranged to determine an effectiveness or success rate associated with an agent's processing of a contact. The effectiveness of an agent during a session can be quantified using agent feedback, for example, an indication of a sale being made, or a problem being solved, sentiment sensors to determine a tone of a customers voice, and/or a text analyzer, to parse text of an email or IM, to thereby determine the satisfaction or otherwise of a customer. This information is then preferably utilized to rank or prioritize the specific agent with respect to other agents at the contact center, and furthermore, if necessary, to recommend additional training for selected agents to thereby increase their effectiveness in dealing with contacts relating to a specific media type or subject.

Furthermore, an agent identified as underperforming can be temporarily removed from the available agent list for the skill category in which they are underperforming, and inserted, into the monitor resource buffer or resource queue, as appropriate, as a monitor for that skill category. Following a sequence of monitoring or observing agents who are performing adequately in that skill category, the agent becomes available again to process live contacts for that skill category, and is preferably removed from the monitor resource buffer or resource queue, depending on the embodiment employed.

In a further embodiment, in order to provide a simulation of an agent's workload, a schedule will be derived or defined for each monitor, the schedule including a rota of times and durations associated with each monitor. For example, the schedule can include a rota of times and durations for which a) the monitor should be forked specific sessions, b) the monitor should be fed training information for example, and c) the monitor should be on a break. Preferably, the schedule will involve forking specific sessions to the monitor at selected monitoring times, and feeding the monitor alternative tasks, such as a training information during other periods. In this way, a real working day of an experienced agent can be simulated, thereby providing the monitor, for example, the trainee agent or a supervisor, with a true sense of a typical agent's workload.

The invention is not limited to the embodiment(s) described herein but can be amended or modified without departing from the scope of the present invention.

What is claimed is:

1. A system for monitoring contact sessions of a contact center, the system comprising:
   a work assignment engine for allocating contacts received at the contact center to resources of the contact center; and
   a monitoring module, arranged to detect an allocation of a contact to a resource and determine a skill requirement of the contact;
   wherein the work assignment engine is further arranged to fork a session between an originator of the contact and the resource, to a monitor resource, in response to the detected skill requirement satisfying a monitor resource skill requirement, and wherein the monitoring module determines a skill requirement of the contact by monitoring the session to identify the skill requirements employed.

2. The system of claim 1 wherein the work assignment engine maintains at least one contact skillset queue and is arranged to assign contacts received at the contact center to one of more of the at least one contact skillset queue in accordance with information gleaned from a source selected from a group consisting of the contact during an IVR session and data retrieved from the customer's profile.

3. The system of claim 1 wherein the skill requirement of the contact corresponds with the skills associated with the contact skillset queue to which the contact was assigned.

4. The system of claim 1 wherein the monitoring module determines a skill requirement of the contact by accessing information gleaned from a source selected from a group consisting of the contact during an IVR session and data retrieved from the customer's profile.

5. The system of claim 1 wherein the work assignment engine maintains a resource queue and is arranged to assign agents of the contact center to the resource queue based on agent configuration information.

6. The system of claim 5 wherein agent configuration information comprises agent skills including one or more of: languages, competence in different topics associated with the contact centre, contact type, single or multitasking contact capabilities, and agent location.

7. The system of claim 1 wherein one selected from a group consisting of the work assignment engine and the monitoring module is capable of accessing a monitor configuration database to retrieve monitor resource skill requirements.

8. The system of claim 7 wherein the monitor configuration database comprises a schedule defined for each monitor, wherein the schedule comprises times for allocation of session and or training programs to the respective monitor resources, to thereby simulate a workload of an experienced agent of the contact centre.

9. The system of claim 1 wherein the work assignment engine is arranged to assign monitor resources to one or more monitor resource skillsets.

10. The system of claim 1 wherein the work assignment engine maintains a monitor resource buffer to which monitor resources are assigned based on monitor configuration information.

11. The system of claim 5 wherein the work assignment engine is arranged to assign monitor resources to the resource queues, based on monitor configuration information.

12. The system of claim 11 wherein subject to the detected skill requirement satisfying a monitor resource skill requirement, the work assignment engine is arranged to propagate through the resource queue, to determine at least one monitor resource to fork the session to.

13. The system of claim 1 wherein responsive to the detected skill requirement satisfying a monitor resource skill requirement associated with multiple monitor resources, the work assignment engine is arranged to fork the session between the originator of the contact and the resource, to the multiple monitor resources.

14. The system of claim 1 wherein responsive to the session being forked to the monitor resource, the monitor resource is capable of usurping control of the session.

15. The system of claim 1 wherein responsive to the session being forked to the monitor resource, the monitor resource involvement in the session is curbed in accordance with a set of permissions associated with the monitor resource.

16. The system of claim 1 wherein the work assignment engine is further arranged to maintain a schedule for each monitor resource, wherein the schedule comprises a plurality of entries indicating times and associated session types, and the work assignment engine is further arranged to fork the session types to the monitor resource in accordance with the associated times.

17. The system of claim 1 wherein the resources are agent resources of the contact center.

18. The system of claim 1 wherein the monitor resources are trainee agent resources of the contact center.

19. The system of claim 1 wherein the monitor resources are supervisor resources of the contact center.

20. The system of claim 1, wherein the work assignment engine is responsive to a determined contact skill requirement being associated with a cross selling opportunity, to fork the session to one or more monitors associated with monitor skill requirements including cross selling.

21. The system of claim 11 further comprising a performance detector arranged to determine a performance level associated with an agent.

22. The system of claim 21 wherein the system is responsive to the performance level of an agent being less than a threshold for a specific skill requirement, to schedule training for the agent and responsive to the performance level of the agent exceeding a threshold for a specific skill requirement, to cancel scheduled training for the agent.

23. The system of claim 1 wherein the monitoring module comprises an analytics component to detect sentiment expressed during the session.

24. The system of claim 23 wherein the work assignment engine is responsive to the detected sentiment satisfying a skill requirement of the monitor resource to fork the session to the monitor resource.

25. A computer-implemented method of monitoring contact session at a contact center, the method comprising the steps of:
    allocating contacts received at the contact center to resources of the contact center; and
    detecting an allocation of a contact to a resource and determining a skill requirement of the contact by monitoring the session to identify the skill requirements employed;
    forking a session between the contact and the resource to a monitor resource in response to the detected skill requirement satisfying a monitor resource skill requirement.

26. A system for monitoring contact sessions of a contact center, the system comprising:
    a work assignment engine for assigning contacts received at the contact center to resources of the contact center; and
    a monitoring module, arranged to detect an assignment of a contact to a resource and determine a skill requirement of the contact by monitoring the session to identify the skill requirements employed;
    wherein the work assignment engine is further arranged to fork a session between the originator of the contact and the resource, to a monitor resource, in response to the detected skill requirement satisfying a monitor resource skill requirement.

27. A system for monitoring contact sessions of a contact center, the system comprising:
    a work assignment engine for assigning contacts received at the contact center to resources of the contact center; and
    a monitoring module, arranged to detect an initialization of a session between the originator of a contact and a resource and to determine a skill requirement of the session;

wherein the work assignment engine is further arranged to fork the session to a monitor resource, in response to the detected skill requirement satisfying a monitor resource skill requirement, wherein the determination of a skill requirement of a session involves monitoring the session to identify the skill requirements employed, and wherein the monitoring module is further arranged to monitor the session and update the skill requirement associated with the session, based on information derived from the monitored session.

28. The system of claim 27 wherein the determination of a skill requirement of a session involves accessing information gleaned from a source selected from a group consisting of the contact during an IVR session and data retrieved from the customer's profile.

* * * * *